March 19, 1935.

J. E. GORTNER

Re. 19,502

RADIATOR UNIT

Original Filed Feb. 18, 1929

Inventor

James E. Gortner

By Clarence A. O'Brien

Attorney

Reissued Mar. 19, 1935

Re. 19,502

UNITED STATES PATENT OFFICE 19,502

RADIATOR UNIT

James E. Gortner, Shamokin, Pa.

Original No. 1,744,074, dated January 21, 1930, Serial No. 340,832, February 18, 1929. Application for reissue January 20, 1932, Serial No. 587,831

8 Claims. (Cl. 257—262)

The present invention relates to new and useful improvements in the art generally known as heat exchange, and more particularly the invention has reference to a novel radiator unit which may be employed in the construction of heat transfer or condensation equipment, cooling systems, radiators for locomotives, gasoline engines, aeroplanes, and condensers for all purposes.

The principal object of this invention is to provide a radiator unit including a water tube which is capable of being readily repaired without discarding the water tube proper providing the latter is not ruptured.

Another salient object is to provide a radiator unit having a removable fin construction.

Another very important object is to provide a fin construction capable of being readily applied to radiator constructions not originally provided with cooling fins.

Still another object is to provide a cooling fin for radiator water tubes which is capable of being manufactured at low cost because of its extremely brief construction.

These and other objects of the invention will become more apparent to the reader, after considering the invention as described and claimed hereinafter.

In the drawing:—

Figure 1:
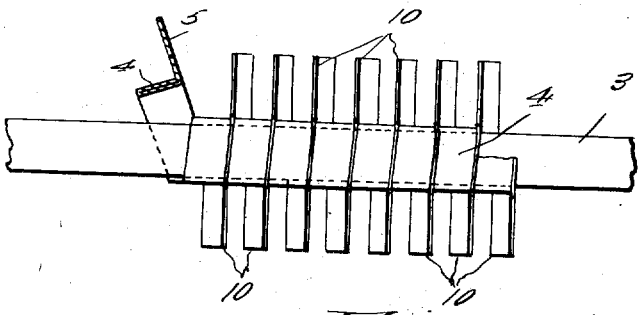
Figure 1 represents a fragmentary partial sectional view of the improved unit.
Figure 2:
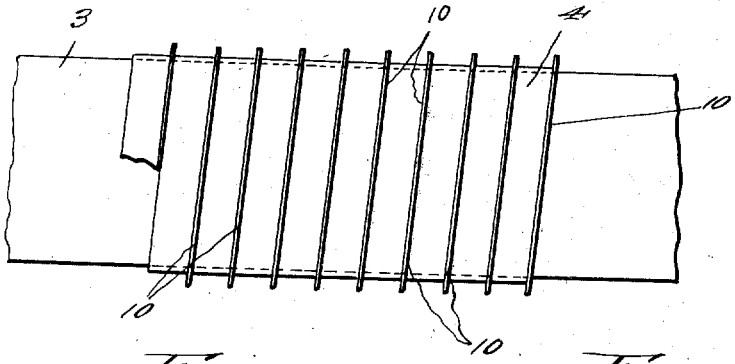
Figure 2 is a fragmentary side elevation of the radiator unit.
Figure 4:
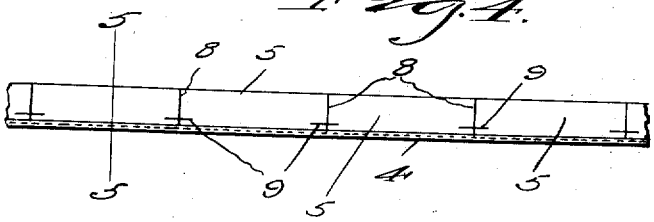
Figure 4 is a fragmentary elevation of the fin construction shown in extended position.
Figure 3:
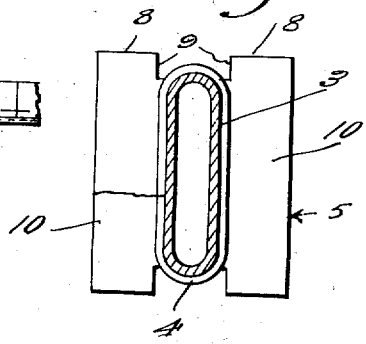
Figure 3 is a cross sectional view of the unit.
Figure 5:
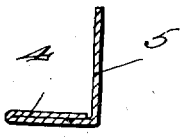
Figure 5 is a cross sectional view of the fin taken substantially on the line 5—5 of Figure 4.

Referring to the drawing wherein like numerals designate like parts, the improved radiator unit includes a water tube 3, which may be of any cross sectional shape, but for the purpose of illustration, and explanation, the water tube of substantially rectangular cross section has been elected. The tube 3 may be utilized for conducting fluids in general, and may be constructed as a flattened tube or an oblong tube with rounded ends as shown in Figure 3.

The novel fin construction embodies an elongated strip of suitable ductile material, preferably copper, constructed in the following manner for convolution on the water tube 3. The strip has one longitudinal edge portion bent upon itself as at 4 for obviously reinforcing this portion of the strip which must contact with the tube 3.

Figure 6:
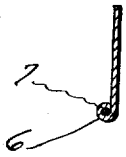
Figure 6 is a cross sectional view of a slightly modified form of fin.

The opposite edge portion of the strip is disposed laterally to provide a flange 5. In Figure 6 a slightly modified form of the fin is shown, wherein the strip is rolled at one longitudinal edge portion as at 6 over a reinforcing element 7. The flange construction of each form is provided at predetermined spaced intervals with transversely extending slits 8 extending inwardly from the free edge of the flange. The flange of each form is provided with longitudinally extending and spaced slits 9, each intersecting one of the transverse slits 8.

It will thus be seen that by convoluting the strengthened edge portion of the strip on the water tube 3, the flanges will break at the slit 8 and due to the intersection of the slits 8 by the slits 9, the flange will assume the character of individual wings 10, projecting beyond the opposite sides of the tube 3. The slits or cuts 8 and 9 are provided in flange 5 at definite intervals so that when the strip is wound on a tube of a form shown in Figure 3, individual wings or fins 10 are formed which extend for substantially the entire length of the long sides of the tube. When the strip is wound on a tube, one portion thereof is in contact with the tube and the wings or fins 10 form extended areas for providing radiating means for the tube. Obviously in the manufacture of this novel unit, various changes may be made in the shape, size, materials, without departing from the spirit and scope of the invention as claimed hereinafter.

Having thus described my invention, what I claim as new is:—

1. A radiator unit comprising a water tube and a fin, said fin comprising an elongated strip of relatively heavy material and a flange at one longitudinal edge thereof, said flange being slitted transversely from its free edge at predetermined intervals substantially equal to the width of the water tube, said flange being provided with longitudinally extending and spaced slits, each intersecting one of the transverse slits.

2. A device of the character described, comprising a flattened tube and a spirally disposed strip thereon having a portion contacting said tube, said portion being positioned so that the exterior of the tube is substantially covered, said strip being provided with a plurality of alined wings or fins on each side of said tube and extending for substantially the full length of the sides of said tube.

3. A radiator unit comprising a tube flattened in cross-section to form long sides and narrow ends, a fin strip formed of a continuous strip of relatively thin metal cut at suitably spaced intervals and spirally wrapped around said tube with the cut portions at said narrow ends so as to form long radiating wings on the long sides of the tube.

4. A radiator unit comprising a tube flattened in cross-section to form long sides and narrow ends, a fin strip formed of a continuous strip of relatively thin metal cut at suitably spaced intervals and spirally wrapped around said tube with the cut portions at said narrow ends so as to form a plurality of separate spaced long radiating wings on each of the long sides of the tube in staggered relation with respect to the respective opposite wings.

5. A radiator unit comprising in combination, a tube having a substantially rectangular cross section; and a flanged strip wrapped spirally about the tube, the flange being divided by combined longitudinal and transverse cuts into a series of outwardly extending wings, the wings being located at opposite sides of the tube connected by portions of the strip freed longitudinally and transversely by said cuts.

6. A radiator unit comprising in combination a tube having a substantially rectangular cross section, and a flanged strip wrapped spirally about the tube, the flange being divided by intersecting longitudinal and transverse slits into a series of outwardly extending wings located at opposite sides of the tube, the longitudinal slits being located at the base of the flange and the transverse slits intersecting them intermediate their ends.

7. A radiator unit comprising in combination a flattened tube; a strip wrapped spirally about said tube; and outwardly extending wings at opposite sides of the tube which individually are longer than said sides and which except at their free ends are longitudinally integral with the strip.

8. A flanged strip for radiating heat adapted to be spirally wrapped and secured about a suitable tube, the flange being divided by intersecting longitudinal and transverse slits into a series of outwardly extending wings, the longitudinal slits being located at the base of the flange and the transverse slits intersecting them intermediate their ends.

JAMES E. GORTNER.